(12) United States Patent
Hunt et al.

(10) Patent No.: US 10,208,879 B2
(45) Date of Patent: Feb. 19, 2019

(54) FLUID CONNECTOR ASSEMBLY

(71) Applicants: Mitchell W. Hunt, Durand, MI (US); Matthew D. Lutzke, Clarkston, MI (US); Julien Locatelli, Rochester Hills, MI (US); Manuel Martinez, Utica, MI (US); Albert Raymond, Grenoble (FR); Richard Geist, Southfield, MI (US); Scott McNab, Bloomfield Hills, MI (US)

(72) Inventors: Mitchell W. Hunt, Durand, MI (US); Matthew D. Lutzke, Clarkston, MI (US); Julien Locatelli, Rochester Hills, MI (US); Manuel Martinez, Utica, MI (US); Albert Raymond, Grenoble (FR); Richard Geist, Southfield, MI (US); Scott McNab, Bloomfield Hills, MI (US)

(73) Assignee: A. RAYMOND ET CIE (FR)

( * ) Notice: Subject to any disclaimer, the term of this patent is extended or adjusted under 35 U.S.C. 154(b) by 186 days.

(21) Appl. No.: 15/169,573

(22) Filed: May 31, 2016

(65) Prior Publication Data
US 2017/0343144 A1    Nov. 30, 2017

(51) Int. Cl.
*F16L 41/02*    (2006.01)
*F16L 37/133*    (2006.01)
(Continued)

(52) U.S. Cl.
CPC ............ *F16L 41/021* (2013.01); *F16L 37/133* (2013.01); *F16L 41/025* (2013.01); *F28F 1/022* (2013.01);
(Continued)

(58) Field of Classification Search
CPC ......... F16L 41/08; F16L 41/088; F16L 41/12; F16L 37/0847; F16L 37/096;
(Continued)

(56) References Cited

U.S. PATENT DOCUMENTS 2,918,053 A * 12/1959 Epstein ............... F16L 37/0985
126/307 R
4,678,112 A    7/1987 Koisuka et al.
(Continued)

FOREIGN PATENT DOCUMENTS

DE    102008016015 B3 *  9/2009   ............. F16L 41/08
EP    435274 A2    7/1991
(Continued)

*Primary Examiner* — David Bochna
(74) *Attorney, Agent, or Firm* — Dickinson Wright PLLC (57) ABSTRACT

The fluid connector assembly includes a connector body with an intermediate portion that extends between opposite end portions and has a first bore. The connector body has an elongated wall that projects outwardly from the intermediate portion and that surrounds a second bore which opens to the first bore. A flat tube, which is made of a second material that is different than the first material and has at least one fluid passage, is in fluid communication with the second bore of the connector body. The flat tube has generally flat side walls and is lockingly retained with the connector body by male and female locking structures that cooperate with one another.

12 Claims, 13 Drawing Sheets

(51) Int. Cl.
    *F28F 9/02*           (2006.01)
    *F28F 9/06*           (2006.01)
    *F28F 21/06*          (2006.01)
    *F28F 21/08*          (2006.01)
    *F28F 1/02*           (2006.01)

(52) U.S. Cl.
    CPC .............. *F28F 9/0246* (2013.01); *F28F 9/06* (2013.01); *F28F 21/067* (2013.01); *F28F 21/084* (2013.01); *F28F 2230/00* (2013.01); *F28F 2275/085* (2013.01)

(58) Field of Classification Search
    CPC ....... F16L 37/0985; F16L 41/021; F28F 9/06; F28F 9/08; F28F 2275/085
    USPC .................................................... 165/76, 178
    See application file for complete search history.

(56) References Cited

U.S. PATENT DOCUMENTS

| | | | | |
|---|---|---|---|---|
| 4,683,623 A * | 8/1987 | Cannata | ................ | F24B 1/1806 126/318 |
| 4,709,689 A * | 12/1987 | Simcox | .................... | F24J 2/243 126/661 |
| 4,945,635 A | 8/1990 | Nobusue et al. | | |
| 5,022,461 A * | 6/1991 | Potier | .................... | F16L 37/56 165/176 |
| 5,101,887 A | 4/1992 | Kado | | |
| 5,170,841 A * | 12/1992 | Briet | ....................... | F16L 37/56 165/176 |
| 5,538,079 A * | 7/1996 | Pawlick | .............. | F28D 1/05366 165/175 |
| 5,806,139 A * | 9/1998 | Anderson | ............. | F16L 41/088 16/2.1 |
| 6,012,513 A * | 1/2000 | Iokawa | .................... | F28F 9/001 165/173 |
| 6,017,064 A * | 1/2000 | Harrington | ............. | F16L 41/08 285/114 |
| 6,032,728 A * | 3/2000 | Ross | ................... | F28D 1/05366 165/173 |
| 6,564,863 B1 * | 5/2003 | Martins | ............... | F28D 1/05383 165/178 |
| 2008/0066897 A1 * | 3/2008 | Boadle | ..................... | F24J 2/243 165/178 |
| 2008/0135222 A1 * | 6/2008 | Biver | ................... | F28D 1/05391 165/178 |
| 2008/0251245 A1 * | 10/2008 | Gorbounov | ............ | F25B 41/06 165/178 |
| 2015/0219262 A1 * | 8/2015 | Schuessler | ............. | F16L 41/08 285/317 |
| 2016/0146388 A1 * | 5/2016 | Smith | ................... | E02B 11/005 285/133.11 |

FOREIGN PATENT DOCUMENTS

| | | | | |
|---|---|---|---|---|
| EP | 1649231 B1 | 4/2006 | | |
| FR | 2939862 A1 * | 6/2010 | ............ | F16L 41/088 |
| FR | 2880671 A1 | 7/2014 | | |

\* cited by examiner

FLUID CONNECTOR ASSEMBLY

BACKGROUND OF THE INVENTION

1. Field of the Invention

The present invention is related generally to fluid connectors and, more particularly, to fluid connectors for coupling one or more hoses with a heat exchange tube.

2. Related Art

Many heat exchangers include one or more flat tubes that are made of metal, such as aluminum which are received into one or more manifolds that distribute a coolant throughout a plurality of fluid passages in the flat tube or tubes. The manifolds are typically connected with the flat tubes through brazing which not only securely joins the flat tubes with the manifolds but also establishes fluid tight seals therebetween. However, for the brazing process to work, both of the materials must be made of metal, and thus, the manifolds of such heat exchangers cannot be made of plastic or other non-metallic materials.

There remains a significant and continuing need for an improved fluid connector that is capable of quickly joining a metal flat tube with a non-metal manifold or connector body.

SUMMARY OF THE INVENTION AND ADVANTAGES

One aspect of the present invention is related to a fluid connector assembly. The fluid connector assembly includes a connector body with a tubular intermediate portion that extends between opposite end portions and has a first bore which extends through the intermediate portion. The connector body has an elongated wall that projects outwardly from the intermediate portion and that surrounds a second bore which opens to the first bore. The fluid connector assembly also includes a flat tube which is made of a second material that is different than the first material. The flat tube has at least one fluid passage which is in fluid communication with the second bore of the connector body, and the flat tube has generally flat side walls. The flat tube is lockingly retained with the connector body by male and female locking structures that cooperate with one another. This aspect of the present invention provides for a quicker more cost efficient way connection between the flat tube and the connector body than other known fluid connector assemblies.

According to another aspect of the present invention, the connector body is made of plastic, and the flat tube is made of metal.

According to yet another aspect of the present invention, the male locking structures are locking tabs, and the female locking structures are locking arms with openings that are shaped to receive the locking tabs.

According to still another aspect of the present invention, the locking tabs are disposed on the flat side walls of the flat tube.

According to a further aspect of the present invention, the locking tabs are bonded with the flat tube with an adhesive.

According to yet a further aspect of the present invention, the fluid connector assembly further includes an adapter which is adhesively bonded with the connector body and includes the locking arms and a through passage and wherein the flat tube extends through the through passage and at least partially into the second bore.

According to still a further aspect of the present invention, the fluid connector assembly further includes an adapter with a through passage and wherein an end of the flat tube is received within the through passage and wherein the flat tube and the through passage are adhesively bonded with one another.

According to another aspect of the present invention, the through passage of the adapter has a first portion and a second portion with the first portion being wider than the second portion and wherein the first portion is filled with an adhesive to establish a secure connection between the adapter and the flat tube and to establish a fluid tight seal between the adapter and the flat tube.

According to yet another aspect of the present invention, the adapter has side walls. The locking tabs are integrally connected with the side walls of the adapter, and the locking arms are integrally connected with the connector body.

According to still another aspect of the present invention, the locking tabs are bonded with the generally flat side walls of the flat tube, and the locking arms are of an elastic material and are joined with the connector body and impart a biasing force between the flat tube and a seal between the flat tube and the connector assembly.

According to a further aspect of the present invention, an adapter is received within the second bore of the connector body and receives the flat tube. The adapter has at least one seal which is sealed with the connector body and with at least one of a side wall of the adapter, a side wall of the flat tube, an end face of the adapter and an end face of the flat tube.

According to yet a further aspect of the present invention, and end of the flat tube has at least one flange, and the at least one seal is sealed against the at least one flange.

According to still a further aspect of the present invention, the at least one flange is integral with the flat tube or is attached with the flat tube or is a part of an end of a thick walled flat tube.

According to another aspect of the present invention, the connector body presents at least one shoulder in the second bore, and the at least one flange is sandwiched between the at least one flange and the at least one shoulder.

According to yet another aspect of the present invention, the at least one seal is adhered to the shoulder.

According to still another aspect of the present invention, the at least one seal is of a curable, liquid injectable sealing material.

Another aspect of the present invention is a method of connecting a flat tube with a fluid connector. The method includes the step of preparing a connector body that is made of a first material and has an intermediate portion which extends between a pair of end portions and a first bore that extends through the intermediate portion and has an elongated wall that projects from the intermediate portion and surrounds a second bore that opens to the first bore. The method continues with the step of preparing a flat tube that is made of a second material, which is different than the first material, and has flat sides. The method proceeds with the step of inserting a portion of the flat tube into the second bore of the connector body. The method continues with the step of connecting male and female locking structures with one another outside of the second bore to interconnect the flat tube with the connector body.

According to another aspect of the present invention, the flat tube is made of metal, and the connector body is made of plastic.

According to yet another aspect of the present invention, the male locking structures are locking tabs that are joined with the flat sides of the flat tube, and the female locking structures are locking arms that are connected with the connector body. The step of connecting the male and female locking structures includes engaging the openings in the locking arms with the locking tabs.

According to still another aspect of the present invention, the locking arms are of an elastic material, and the method further includes the step of stretching the locking arms to engage the openings in the locking arms with the locking tabs.

According to a further aspect of the present invention, the method further includes the step of bonding an adapter, which has a through passage, with either a connector body or the flat tube before the step of inserting at least a portion of the flat tube into the second bore of the connector body.

BRIEF DESCRIPTION OF THE DRAWINGS

These and other features and advantages of the present invention will be readily appreciated as the same becomes better understood by reference to the following detailed description in connection with the accompanying drawings wherein.

DETAILED DESCRIPTION OF THE ENABLING EMBODIMENTS

Referring to the Figures, wherein like numerals indicate corresponding parts throughout the several views, a first exemplary embodiment of a fluid connector assembly 20 which is fluidly connecting two hoses 22 with one another and with a heat exchange tube 24 (hereinafter referred to as the "flat tube") is generally shown in FIGS. 1-4. During operation, the fluid connector assembly 20 functions as a manifold in that it distributes a fluid (such as a coolant) into and receives a fluid (such as a coolant) from the flat tube 24. The fluid connector assembly 20 could find uses in a wide range of different applications including, for example, vehicle cooling systems.

The flat tube 24 which is made of a material with a high thermal conductivity, such as aluminum or an aluminum alloy. The flat tube 24 extends between opposite ends and has a generally constant cross-sectional shape with flat side walls 26 that are interconnected with rounded ends along its entire length. The flat tube 24 has an interior with a plurality of baffles 28 which are spaced from one another to present a plurality of fluid passages 30 for increasing heat transfer between the fluid and the flat tube 24 during operation.

The fluid connector assembly 20 also includes a connector body 32 which extends along an axis A between a pair of spaced apart end portions 34 and a tubular intermediate portion 36 which extends between the end portions 34. The connector body 32 also includes an elongated wall 38 which extends in a radial direction out from the intermediate portion 36 to an end face 40. The elongated wall 38 extends at least half of the axial length, and preferably the entire axial length, of the intermediate portion 36. The connector body 32 is made as a single integral piece that is preferably made of a plastic material and is preferably shaped through injection molding. However, it should be appreciated that any suitable process may be employed to shape the connector body 32.

In this exemplary embodiment, each of the end portions 34 has a plurality of annular barbs 42 that are spaced axially from one another for establishing fluid-tight connections with the hoses 22. Each of the end portions 34 also includes a radially outwardly extending stopping face 44 for establishing a stopping point when inserting the hose 22 onto the respective end portion 34. An O-ring seal 46 is also provided on each of the end portions 34 for further improving the fluid tight seal with the hose 22. However, it should be appreciated that the end portions 34 could alternately have pipe threads or any suitable means of establishing fluid tight connections with hoses, pipes or any types of tubes.

Figure 3:
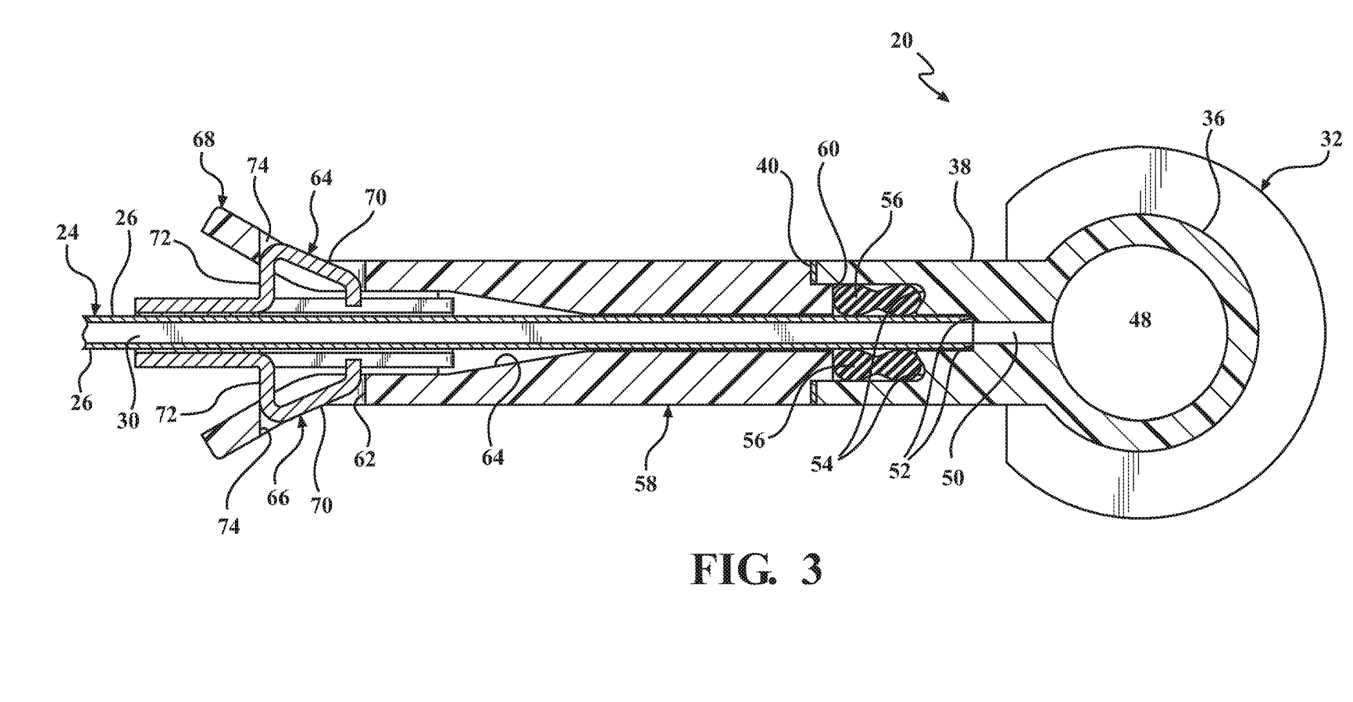
FIG. 3 is a cross-sectional view of the fluid connector assembly of FIG. 1 taken through Line 3-3 of FIG. 1.
Figure 4:
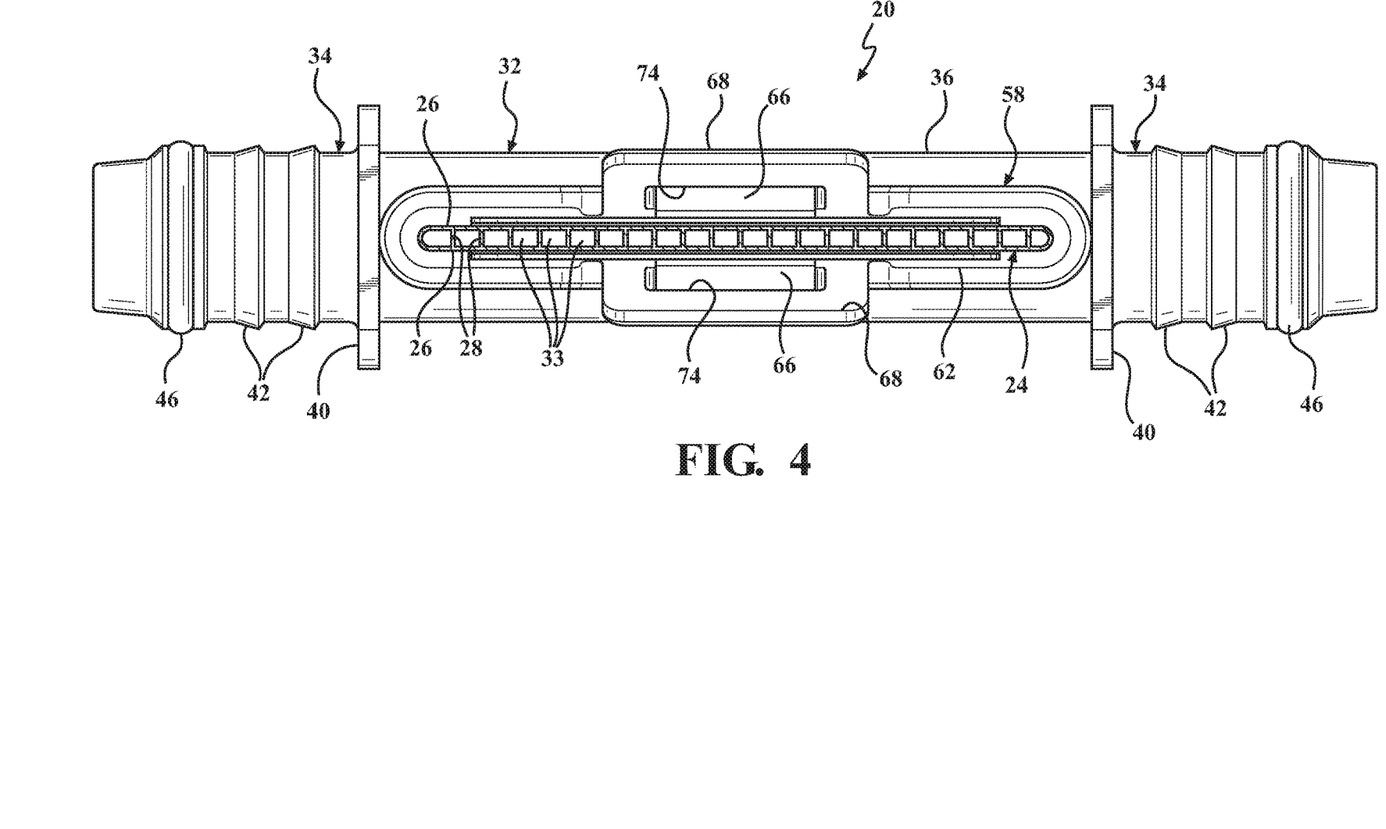
FIG. 4 is a front view of the fluid connector assembly of FIG. 1.
Figure 5:
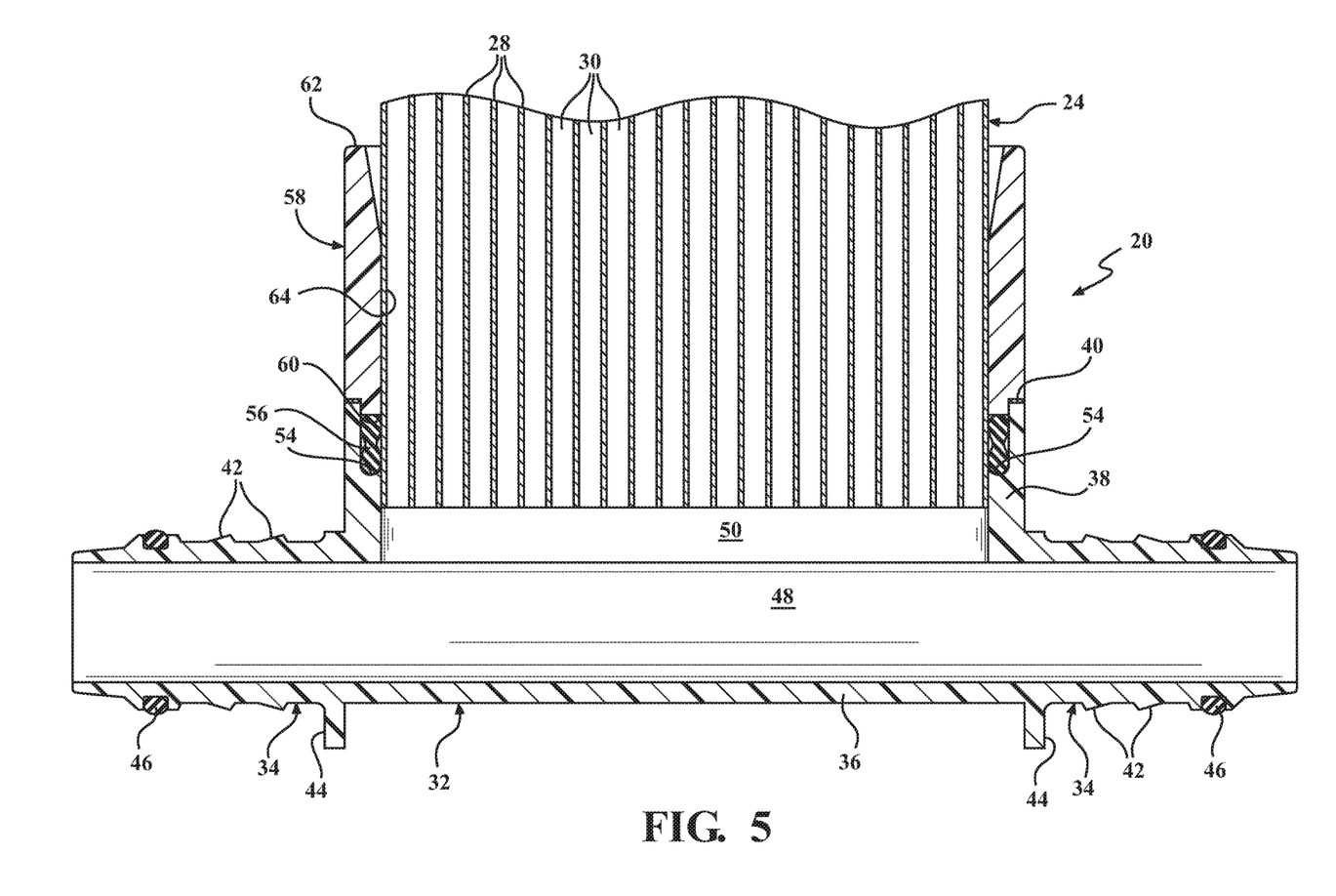
FIG. 5 is a cross-sectional view of the fluid connector assembly of FIG. 5 taken through Line 5-5 of FIG. 4.

As shown in FIGS. 3 and 4, the intermediate portion 36 has a first bore 48 which extends between the end portions 34 for conveying the fluid between the hoses 22 (shown in FIG. 1) connected with the end portions 34. The elongated wall 38 surrounds a second bore 50 that opens to the first bore 48 and extends perpendicularly therefrom. In the exemplary embodiment, the second bore 50 has a generally oval cross-sectional shape with spaced apart flat sides that are interconnected with rounded ends, and the elongated wall 38 has a generally constant wall thickness around the second bore 50.

The second bore 50 is double-counterbored to present a pair of first shoulders 52 adjacent the intermediate portion 36 of the connector body 32 and to present a pair of second shoulders 54 between the first shoulders 52 and the end face 40. At least one seal 56 is disposed in the second bore 50 and is in contact with the second shoulders 54. The flat tube 24 is partially received within the second bore 50 of the elongated wall 38 such that an end of the flat tube 24 is in surface to surface contact with the first shoulders 52 which establish a stopping point for the insertion of the flat tube 24 into the second bore 50. In the exemplary embodiment, the exemplary seal 56 is a double bump seal in that it has two inwardly extending bumps that are in contact with the side walls 26 and the round ends of the flat tube 24 for establishing two fluid-tight seals between the connector body 32 and the flat tube 24. However, it should be appreciated that the seal 56 may take any suitable configuration. For example, the seal could be a silicone seal that is injected into the second bore 50 as a liquid and allowed to cure within the second bore.

Figure 1:
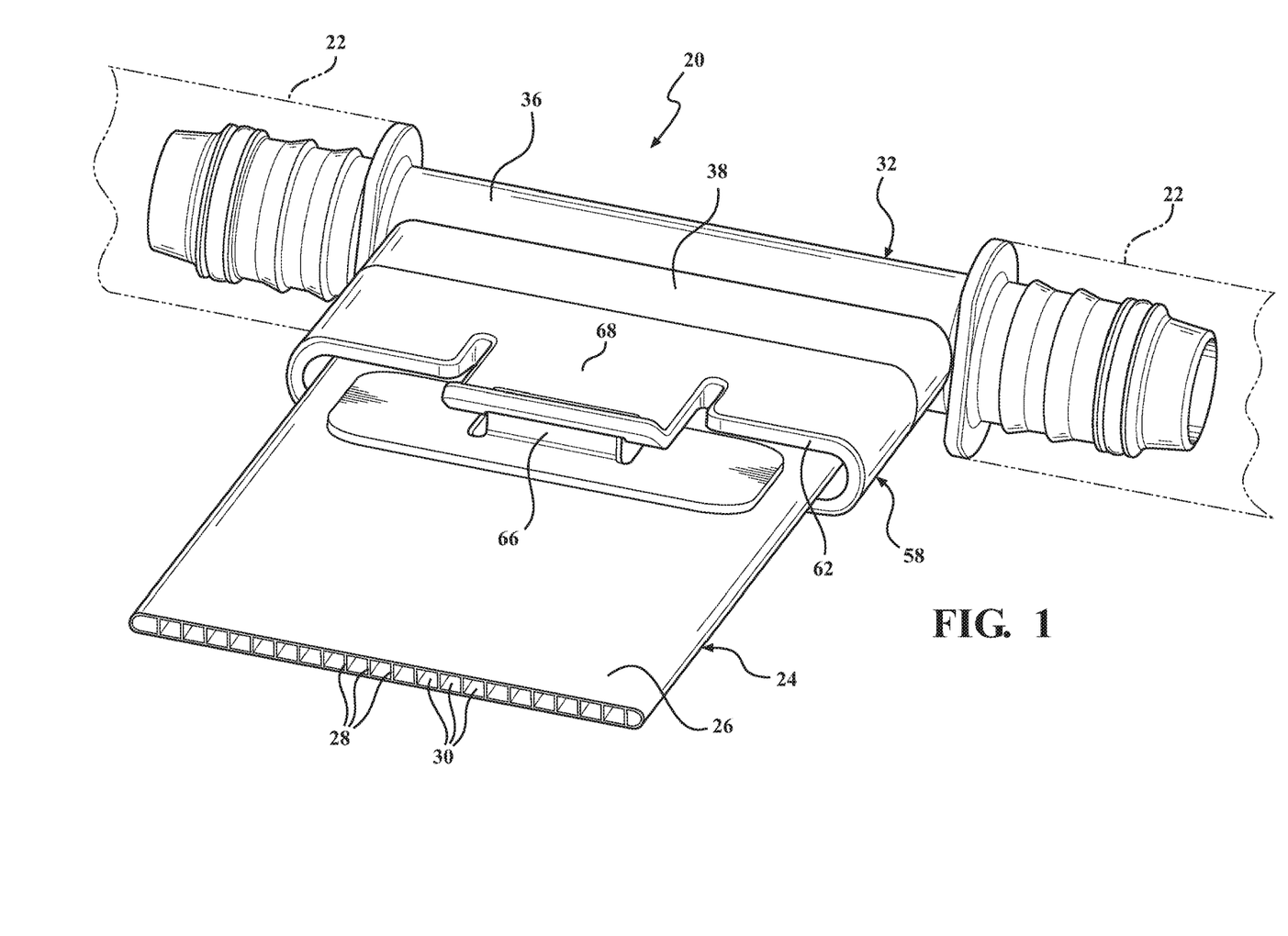
FIG. 1 is a perspective elevation view of a first exemplary embodiment of a fluid connector assembly.
Figure 2:
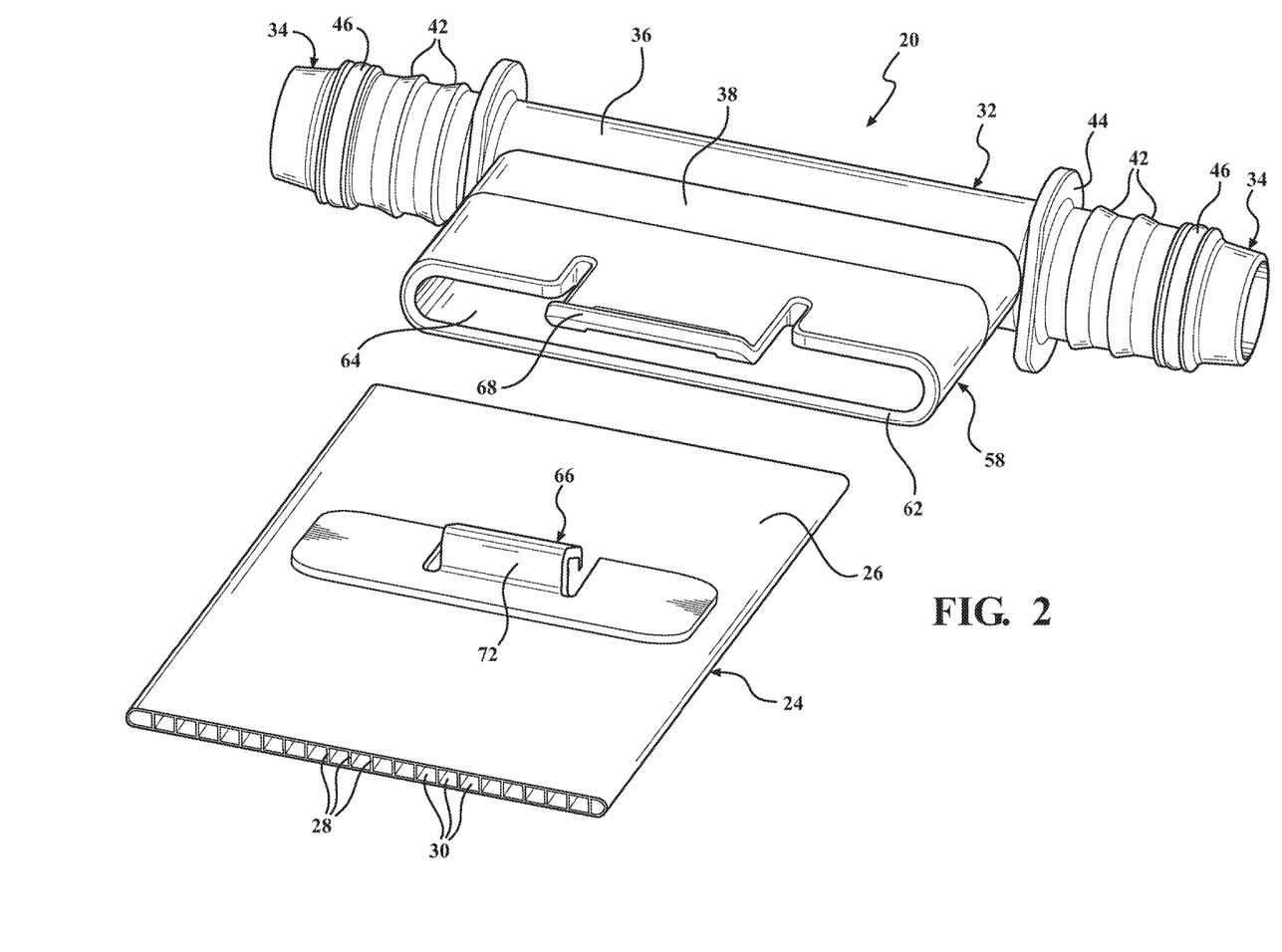
FIG. 2 is another perspective view of the fluid connector assembly of FIG. 1 and with the flat tube withdrawn from a second bore of a connector body.

The fluid connector assembly 20 additionally includes an adapter 58 which lockingly connects the connector body 32 with the flat tube 24. The adapter 58 extends from a first adapter end 60 to a second adapter end 62. The first adapter end 60 is partially received within the second bore 50 of the connector body 32 and is seated against the end face 40 of the elongated wall 38. The adapter 58 is preferably made of a single, integral piece of plastic through an injection molding process and is adhesively bonded with the elongated wall 38 of the connector body 32 to establish a permanent (non-detachable) connection between the adapter 58 and the connector body 32. During assembly, the adapter 58 is preferably bonded with the connector body 32 before the flat tube 24 is attached with either the adapter 58 or the connector body 32.

The adapter 58 has a through passage 64 which tapers inwardly from adjacent the second adapter end 62 towards the first adapter end 60. That is, the through passage 64 is wider adjacent the second adapter end 62 than adjacent the first adapter end 60. In cross-section, the through passage 64 is shaped similarly to the cross-sectional shape of the flat tube 24, and the flat tube 24 extends through the through passage 64 of the adapter 58 and into the second bore 50 of the connector body 32. The tapering of the through passage 64 advantageously guides the flat tube 24 during assembly, making it easier to connect the flat tube 24 with the fluid connector assembly 20.

Male and female locking structures are provided to lock the flat tube 24 with the connector body 32 and adapter 58. In the first exemplary embodiment, the male locking structures are a pair of locking tabs 66 which are fixed with the flat side walls 26 of the flat tube 24, and the female locking structures are a pair of locking arms 68 on the adapter 58. In the exemplary embodiment, the locking tabs 66 are attached with the flat tube 24 via an adhesive at approximately a midpoint between the round ends of the flat tube 24. The locking tabs 66 are aligned with one another both in a lengthwise direction and in a widthwise direction. The adhesive which joins the locking tabs 66 with the flat tube 24 is preferably a heat activated adhesive such as the adhesive sold under the trademark Raybond™, which is a product of A. Raymond®.

Each of the locking tabs 66 has a ramped surface 70, which is at a non-right angle relative to the respective side wall 26 and which faces towards the connector body 32, and has a flat back surface 72, which extends perpendicularly away from the side walls 26 of the flat tube 24. The locking arms 68 extend from the second adapter end 62 of the adapter 58 at an angles relative thereto and are preferably mirror images of one another. The locking arms 68 have openings 74 formed therein that are sized and shaped to receive the locking tabs 66 on the flat tube 24.

The locking arms 68 are resiliently deflectable away from one another to allow for selective engagement and disengagement with and from the locking tabs 66. Specifically, when the flat tube 24 is inserted into the through passage 64 of the adapter 58 through the second adapter end 62, contact between the ramped surfaces 70 of the locking tabs 66 and the locking arms 68 causes the locking arms 68 to resiliently deflect away from one another until the locking tabs 66 are received into the openings 74 of the locking arms 68 at which point the locking arms 68 spring into engagement with the back surfaces 72 of the locking tabs 66 to restrict withdrawal of the flat tube 24 from the through passage 64 of the adapter 58 and from the second bore 50 of the connector body 32. The flat tube 24 may be disconnected from the adapter 58 and the connector body 32 by manually deflecting the locking arms 68 away from one another to separate the openings 74 in the locking arms 68 from the locking tabs 66 and pulling the flat tube 24 out of the through passage 64 of the adapter 58.

Referring now to FIGS. 6-10, a second exemplary embodiment of the fluid connector assembly 120 is generally shown with like numerals, separated by a prefix of "1", indicating corresponding parts with the above-discussed embodiment. In this embodiment, the adapter 158 is configured to be attached with the flat tube 124 before, rather than after, the connector body 132.

Figure 8:
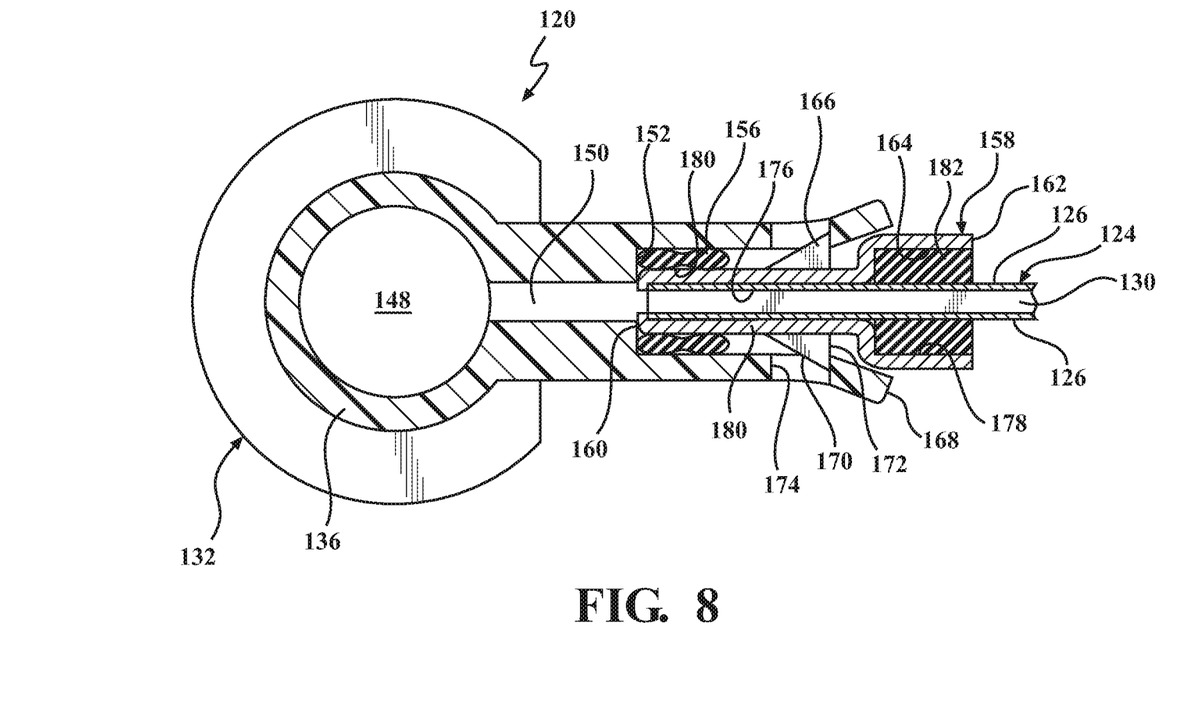
FIG. 8 is a cross-sectional view of the fluid connector assembly of FIG. 6.
Figure 9:
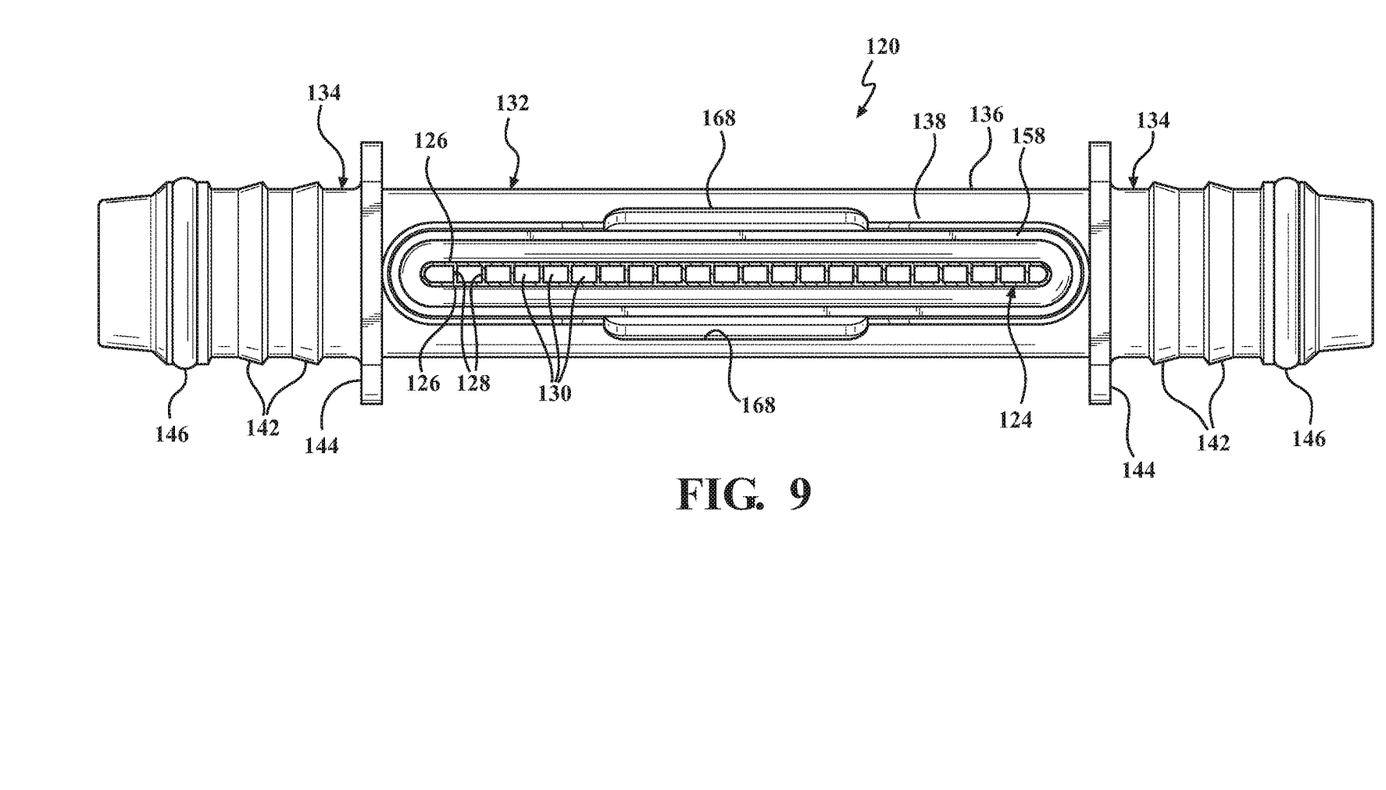
FIG. 9 is a front elevation view of the of the fluid connector assembly of FIG. 6.
Figure 10:
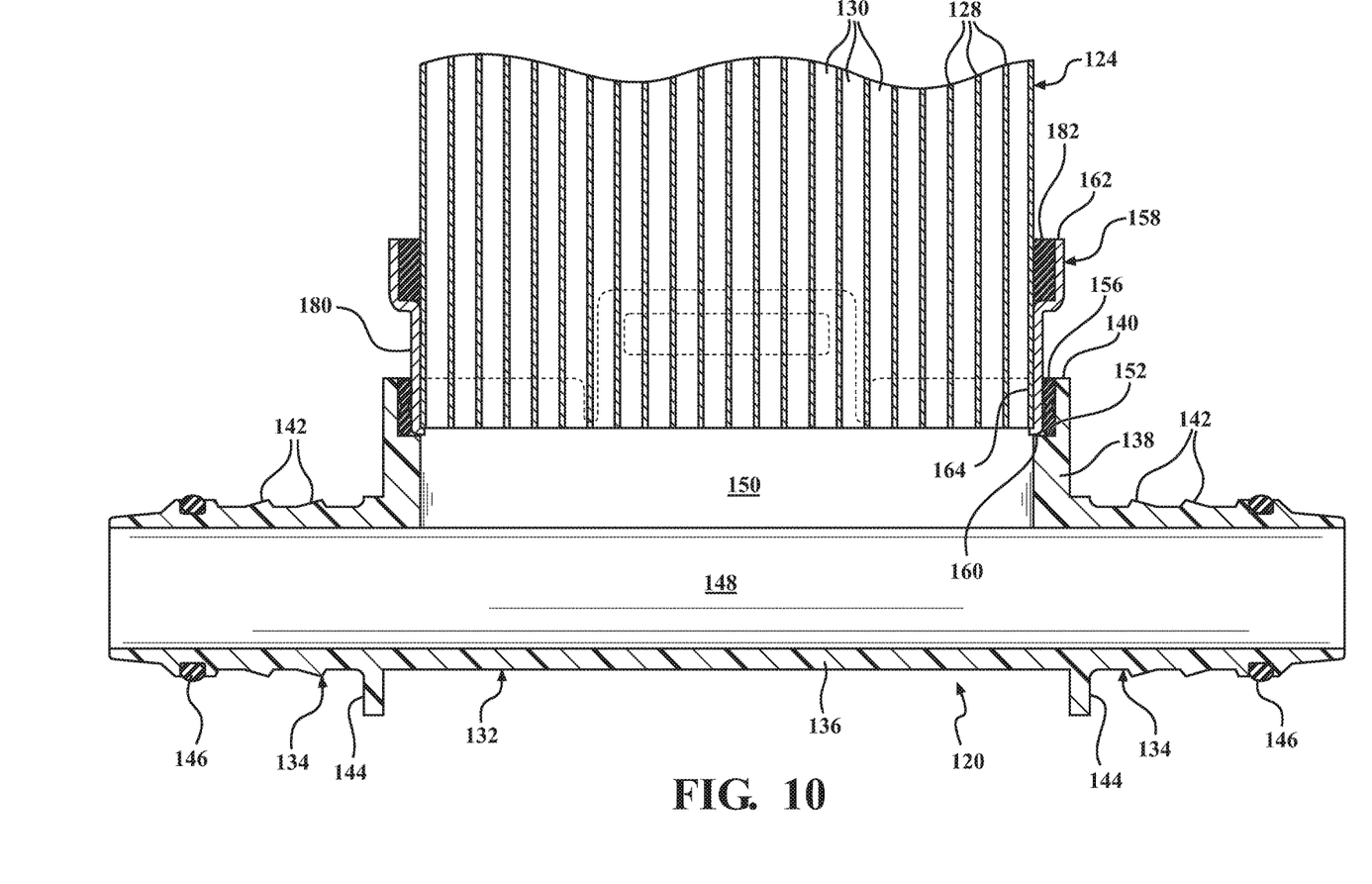
FIG. 10 is another cross-sectional view of the fluid connector assembly of FIG. 6.

The through passage 164 of the adapter 158 has a first portion 176 adjacent the first adapter end 160 and a second portion 178 adjacent the second adapter end 162, and the first portion has a greater width than the second portion. The adapter 158 has side walls 180 which are bent or radiused inwardly towards one another at the second adapter end 162 to present a pair of flanges in the through passage 164 and such that the corners at the first adapter end 160 are curved or rounded. To join the flat tube 124 with the adapter 158, one end of the flat tube 124 is inserted into the through passage 164 through the first adapter end 160 until the end of the adapter 158 contacts the flanges at the second adapter end 162. An adhesive 182 is then injected into the first portion 176 of the adapter 158 and allowed to cure to secure the adapter 158 with the flat tube 124 and to establish a fluid-tight seal between the flat tube 124 and the adapter 158.

Figure 6:
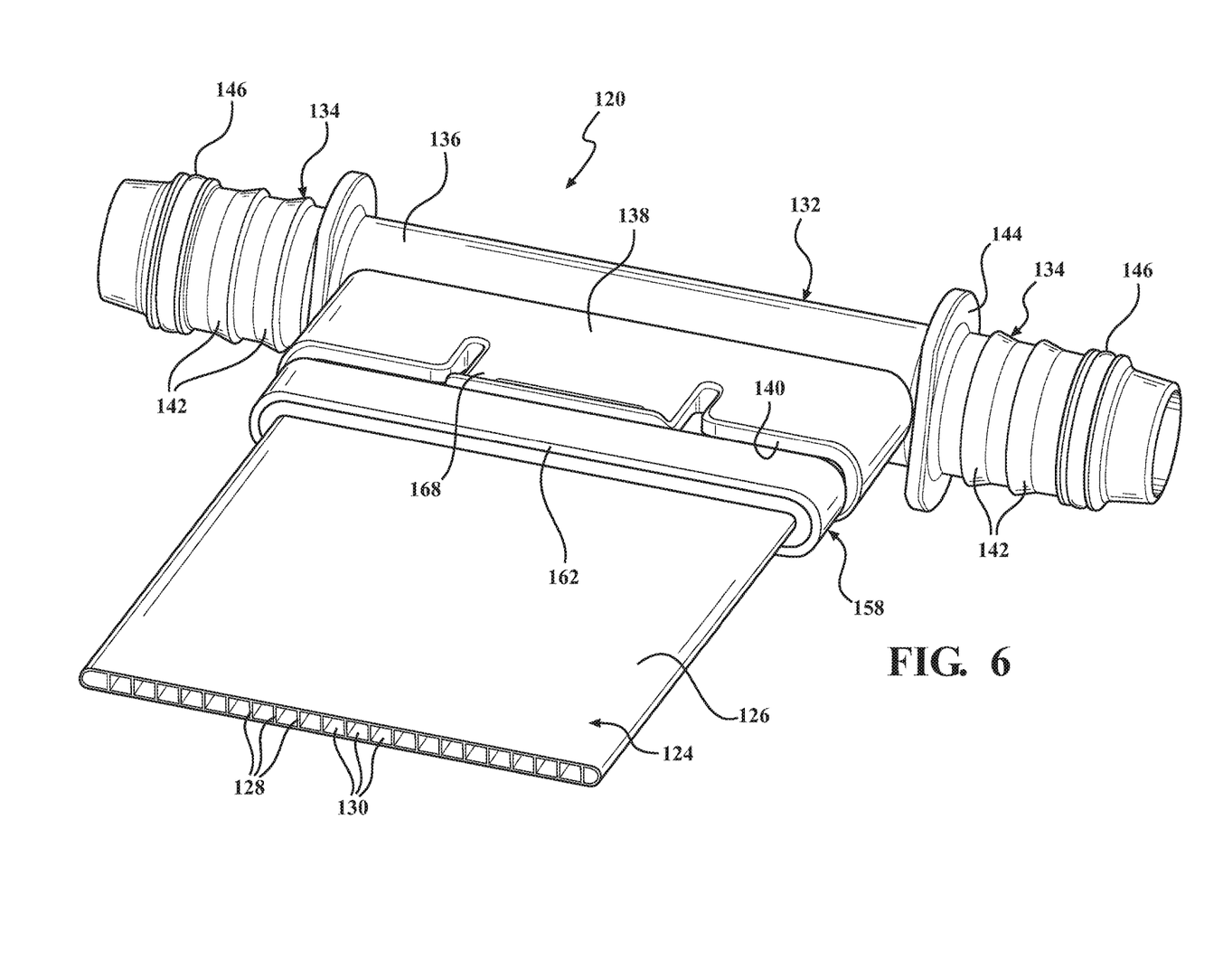
FIG. 6 is a perspective elevation view of a second exemplary embodiment of the fluid connector assembly.
Figure 7:
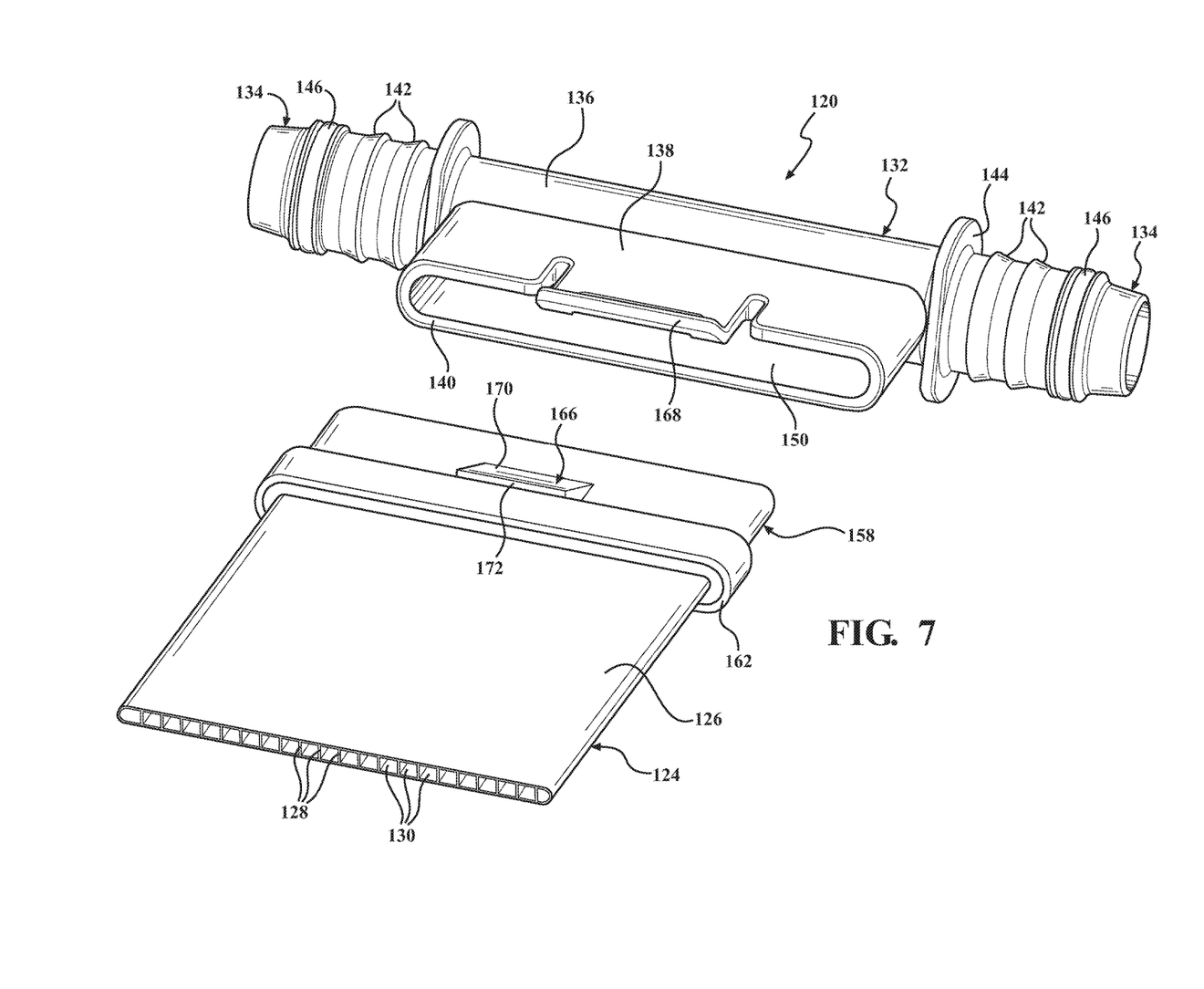
FIG. 7 is a perspective view of the fluid connector assembly of FIG. 6 and showing the flat tube being withdrawn from the connector body.

In this embodiment, the male locking structure is a pair of locking locking tabs 166 on the adapter, and the female locking structure is a pair of locking arms 168 are on the connector body. The locking tabs 166 are integrally made with the side walls 158 of the adapter 158 and, similar to the first embodiment discussed above, have ramped surfaces 170 and back surfaces 172. The locking tabs 166 are positioned on the side walls 180 of the adapter 158 in line with the first portion 176 of the through passage 164.

The adapter 158 and flat tube 124 are joined with the connector body 132 by inserting the adapter 158 into the second bore 150 of the connector body 132. The rounded corners of the adapter 158 at the second adapter end 162 protect the double bump seal 156 from damage as the adapter 158 is inserted into the second bore 150, and when the adapter 158 is fully inserted into the second bore 150, the double bump seal 156 contacts the side walls 180 of the adapter 158 to establish a fluid tight seal between the connector body 132 and the adapter 158. The outer surfaces of the side walls 180 may be roughened or textured to improve the fluid tight seal established with the double bump seal 156.

Figure 11:
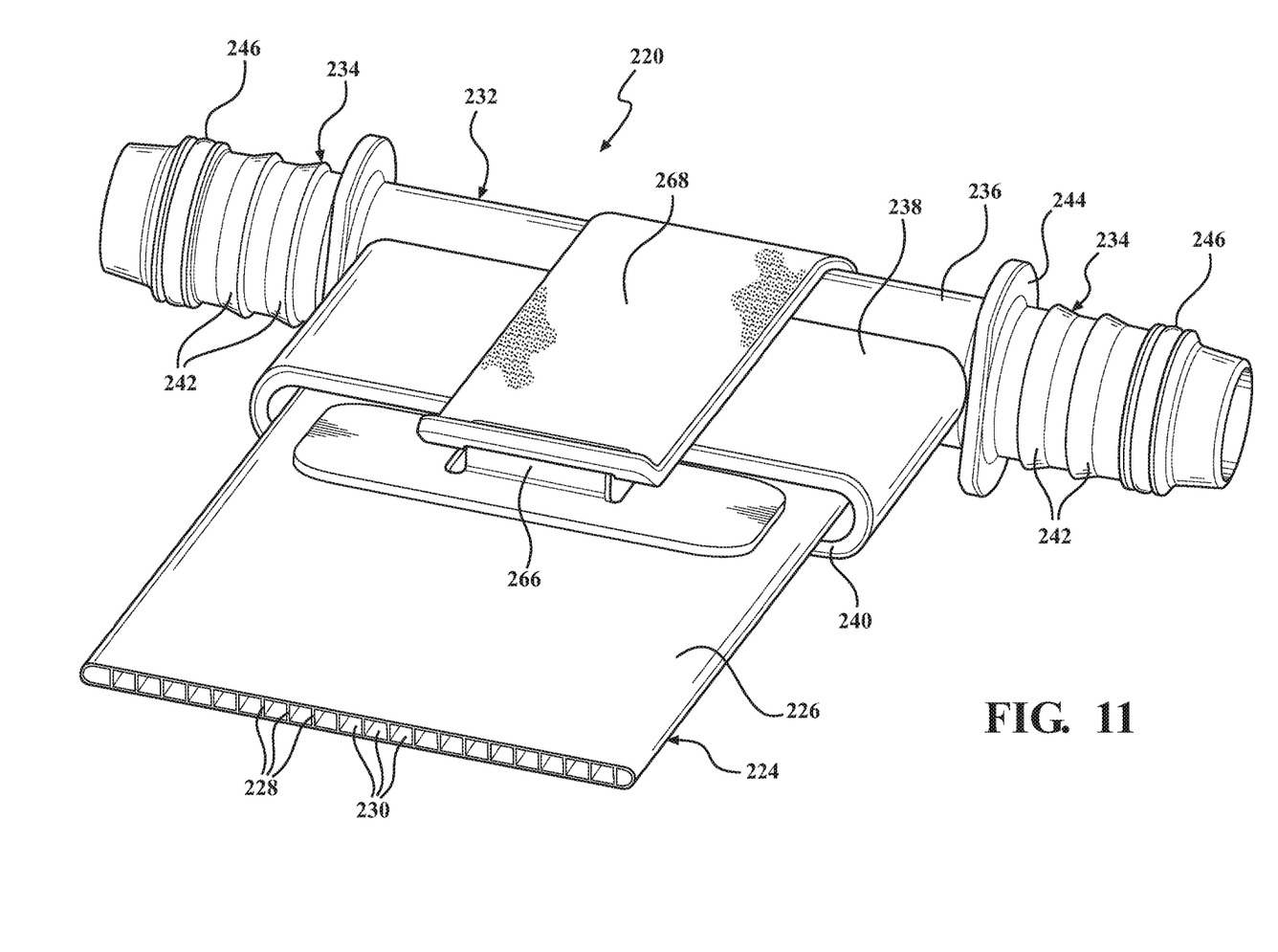
FIG. 11 is a perspective elevation view of a third exemplary embodiment of the fluid connector assembly.
Figure 12:
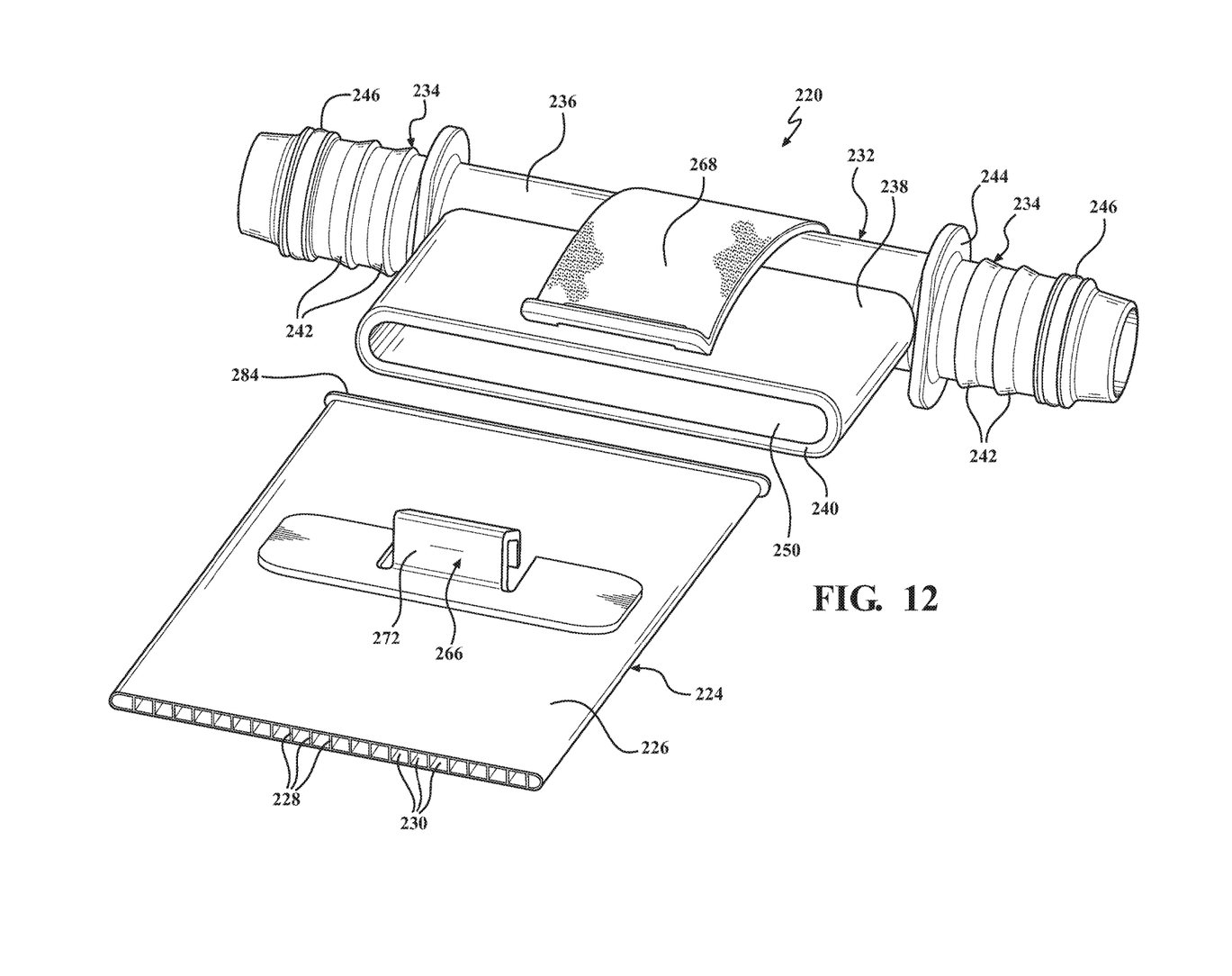
FIG. 12 is a perspective view of the fluid connector assembly of FIG. 11 and showing the flat tube being withdrawn from the connector body.
Figure 13:
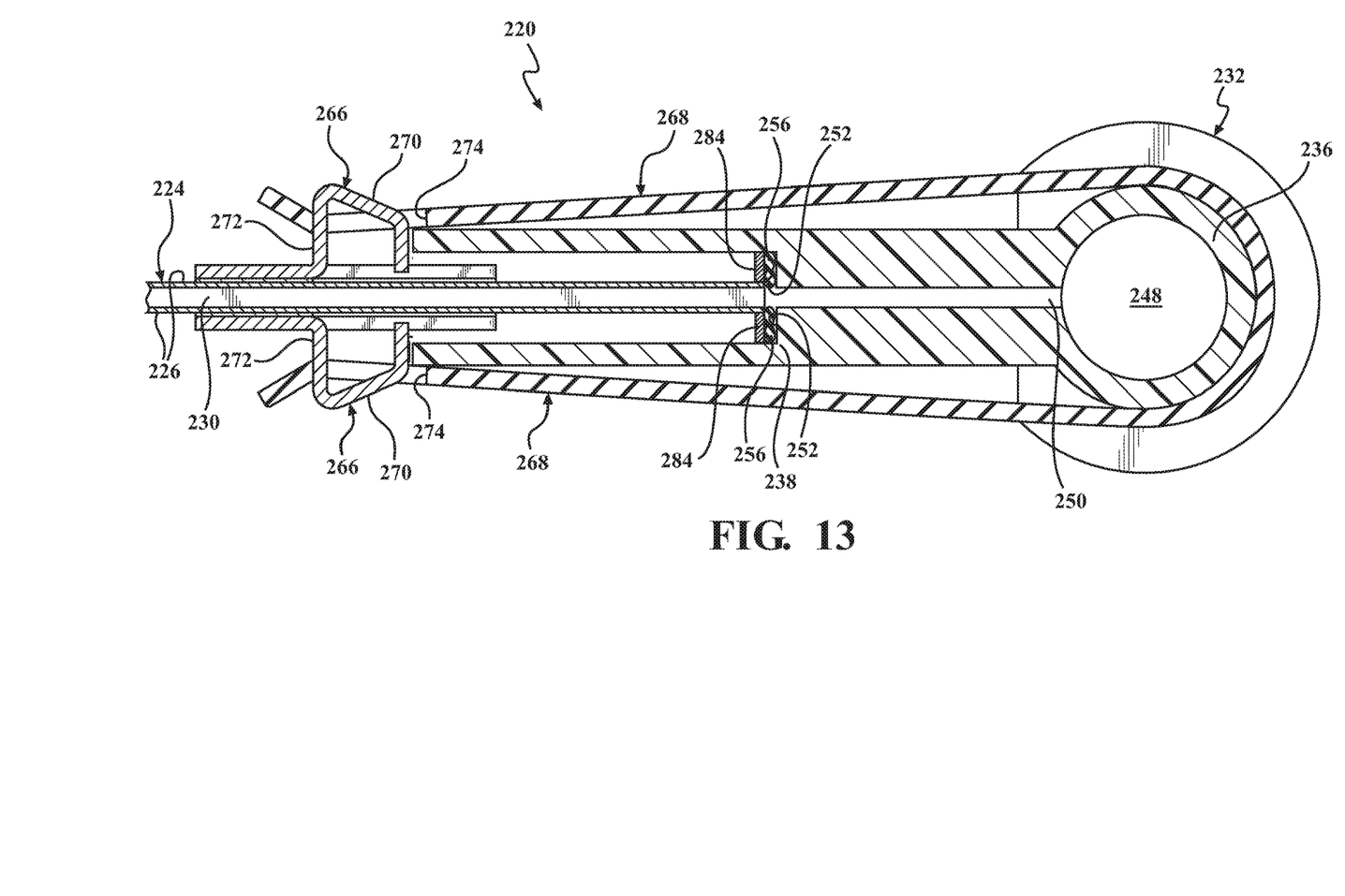
FIG. 13 is a cross-sectional view of the fluid connector assembly of FIG. 11.

Referring now to FIGS. 11-13, a third exemplary embodiment of the fluid connector assembly 220 is generally shown with like numerals, separated by a prefix of "2" indicating corresponding elements with the above-described embodiments. In contrast to the first and second embodiments discussed above, the third embodiment of the fluid connector assembly 200 lacks an adapter. Rather, the flat tube 224 is inserted directly into the second bore 250 of the connector body 232. As shown, a pair of flanges 284 are bonded with the flat tube 224 at one of the tube ends. When the flat tube 224 is inserted into the second bore 250, the flanges 284 press against the seal 256 to establish a fluid tight seal between the flat tube 224 and the connector body 232. That is, in this embodiment, the seal 256 is sandwiched between the shoulder 252 of the connector body 232 and the flanges 284 on the flat tube 224. The flanges 284 on the flat tube 224 could take a range of different configurations. For example, the flanges 284 could alternately be integrally formed with the flat tube 224 as one integral piece, or the flanges 284 could correspond to a perimeter surface of an end of a thick walled flat tube 224.

In this embodiment, the male locking structures are locking tabs 266 that are adhesively bonded with the flat side walls 226 of the flat tube 224, and the female locking structures are a pair of locking arms 268 that are made as a separate piece from the connector body 232 and overmolded into engagement with the connector body 232. The locking arms 268 are made of an elastically stretchable material such that when the openings 274 in the locking arms 268 engage the locking tabs 266, the flanges 284 on the flat tube 224 are biased or urged against the the seal 256 to improve the durability of the fluid-tight seal between the flat tube 224 and the connector body 232. In the exemplary embodiment, the locking arms 268 are integrally connected with one another and circle around the intermediate portion 236 of the connector body 232 but could alternately be made as separate pieces and can be attached with the connector body 232 through any suitable means.

In this embodiment, the flat tube 224 is connected with the connector body 232 by inserting the flat tube 224 into the second bore 250 until the flanges 284 contact the seal 256 in the second bore 250. Next, the elastic locking arms 268 are stretched to engage receive the locking tabs 266 on the flat tube 224 within the openings 274 on the locking arms 268. The elasticity of the locking arms 268 imparts a biasing force on the flat tube 224 to urge the flat tube 224 against the seal 256 in the second bore 250. The flat tube 224 may be detached from the connector body 232 by pulling the locking arms 268 away from the locking tabs 266 and sliding the flat tube 224 out of the second bore 250.

Obviously, many modifications and variations of the present invention are possible in light of the above teachings and may be practiced otherwise than as specifically described while within the scope of the appended claims.

What is claimed is:

1. A fluid connector assembly, comprising:
   a connector body made of a first material, said connector body having a tubular intermediate portion that extends between opposite end portions, and said connector body having a first bore which extends through said intermediate portion;
   said connector body having an elongated wall that projects outwardly from said intermediate portion and that surrounds a second bore which opens to said first bore;
   a flat tube made of second material that is different than said first material, said flat tube having at least one fluid passage in fluid communication with said second bore of said connector body, and flat said tube having generally flat side walls;
   male and female locking structures cooperating with one another outside of said second bore to lockingly retain said flat tube with said connector body;
   said male locking structures being locking tabs and said female locking structures being locking arms with openings that are shaped to receive said locking tabs; and
   an adapter adhesively bonded with said connector body, said adapter including said locking arms and having a through passage, and said flat tube extending through said through passage and at least partially into said second bore of said connector body.

2. The fluid connector assembly as set forth in claim 1 wherein said connector body is made of plastic and said flat tube is made of metal.

3. The fluid connector assembly as set forth in claim 2 wherein said locking tabs are disposed on said flat side walls of said flat tube and wherein said locking arms are of an elastic material and impart a biasing force between said flat tube and a seal between said flat tube and said connector body.

4. The fluid connector assembly as set forth in claim 3 wherein said locking tabs are bonded with said flat side walls of said flat tube with an adhesive.

5. A method of connecting a flat tube with a fluid connector, comprising the steps of:
   preparing a connector body that is made of a first material and has an intermediate portion which extends between a pair of end portions and a first bore which extends through said intermediate portion and an elongated wall which projects from the intermediate portion and surrounds a second bore that opens to the first bore;
   preparing a flat tube that is made of a second material that is different than the first material and that has flat sides;
   inserting a portion of the flat tube into the second bore of the connector body;
   connecting male and female locking structures with one another outside of the second bore to interconnect the flat tube with the connector body; and
   wherein the male locking structures are locking tabs that are joined with the flat sides of the flat tube and wherein the female locking structures are locking arms that are connected with the connector body and have openings that are shaped to receive the locking tabs and wherein the step of connecting the male and female locking structures includes engaging the openings in the locking arms with the locking tabs.

6. The method as set forth in claim 5 wherein the flat tube is made of metal and the connector body is made of plastic.

7. The method as set forth in claim 5 wherein the locking arms are of an elastic material and further including the step of stretching the locking arms to engage the openings in the locking arms with the locking tabs.

8. The method as set forth in claim 5 further including the step of bonding an adapter that has a through passage with either the connector body or the flat tube before the step of inserting at least a portion of the flat tube into the second bore of the connector body.

9. The method as set forth in claim 8 wherein the adapter is bonded with the connector body.

10. The method as set forth in claim 9 wherein the locking arms are monolithic with the adapter.

11. The method as set forth in claim 9 wherein a seal is disposed between the connector body and the flat tube.

12. A fluid connector assembly which can connect with a flat tube, comprising:
   a connector body made of a first material, said connector body having a tubular intermediate portion that extends between opposite end portions, and said connector body having a first bore which extends through said intermediate portion;
   said connector body having an elongated wall that projects outwardly from said intermediate portion and that surrounds a second bore which opens to said first bore;
   an adapter adhesively bonded with said connector body;
   said adapter having a through passage for receiving the flat tube to allow the flat tube to extend partially into said second bore of said connector body; and
   a seal disposed in said second bore and in contact with said connector body and said adapter.

* * * * *